United States Patent [19]

Koslosky et al.

[11] Patent Number: 4,744,003
[45] Date of Patent: May 10, 1988

[54] POWER DISTRIBUTION PANELBOARD

[75] Inventors: Howard E. Koslosky, Wild Rose; John E. Swedowski, Milwaukee; Robert J. Clarey, Brookfield; Allan E. Grams, Elm Grove; Frank Navratil, Thiensville, all of Wis.

[73] Assignee: Eaton Corporation, Cleveland, Ohio

[21] Appl. No.: 35,405

[22] Filed: Apr. 7, 1987

[51] Int. Cl.$^4$ .............................................. H02B 1/04
[52] U.S. Cl. ..................................... 361/363; 361/376; 200/50 C
[58] Field of Search ............. 439/215, 110, 115, 120, 439/121; 200/50 A, 50 C; 174/70 B, 71 B, 88 B, 129 B, 133 B, 144 B, 171; 361/341, 342, 353–356, 358, 361, 363, 376, 378

[56] References Cited

U.S. PATENT DOCUMENTS

| | | | |
|---|---|---|---|
| 1,872,723 | 8/1932 | Frank | 361/355 |
| 2,191,615 | 2/1940 | Frank et al. | 361/351 |
| 3,116,081 | 12/1963 | Goodridge | 292/212 |
| 3,204,150 | 8/1965 | Gauthier | 361/376 |
| 3,211,960 | 10/1965 | Dorfman et al. | 361/376 |
| 3,219,887 | 11/1965 | Gerg et al. | 361/378 |
| 3,328,648 | 6/1967 | Gryctko | 361/335 |
| 3,403,301 | 9/1968 | Mrowka | 361/354 |
| 3,404,315 | 10/1968 | Jacobs | 361/361 |
| 3,657,606 | 4/1972 | Greger et al. | 317/112 |
| 3,786,313 | 1/1974 | Coles et al. | 361/358 |
| 3,806,768 | 4/1974 | Gryctko et al. | 361/338 |
| 4,001,653 | 1/1977 | Olashaw et al. | 361/341 |
| 4,068,287 | 1/1978 | Kruzic et al. | 361/341 |
| 4,419,715 | 12/1983 | Pear | 361/335 |
| 4,446,503 | 5/1984 | Link | 361/363 |
| 4,472,761 | 9/1984 | Koslosky et al. | 361/355 |

OTHER PUBLICATIONS

Square D QMB Panelboards and Switchboards, 8 pages, dated 8/84.
Eaton New Cutler Hammer Field/Factory Assembled Power Distribution Panelboards, 4 pages, Pub. No. NL-202.
Cutler Hammer Panelboards, Technical Information Publication EE 4/15/86.
Temporary Construction Industry Catalog Cutler Hammer Panelboards, 5/15/86.

Primary Examiner—G. P. Tolin
Attorney, Agent, or Firm—D. A. Rowe; L. G. Vande Zande

[57] ABSTRACT

Plug-on enclosed fusible switches, enclosed lug devices and non-enclosed molded case circuit breakers are attached to a panelboard in a single or side-by-side double row. Spring biased latches retain the devices to the panelboard. Locating notches on the panelboard locate the devices at incremental spacing to provide a variable, compact arrangement for the devices. Filler plates and end structures on the devices cooperate with a cover for the panelboard to provide an integral dead front. The panelboard is particularly adapted for field assmebly, including attachment of a main feed device which effects a plug-on feed in either a single or electrically parallel double panel arrangement.

19 Claims, 10 Drawing Sheets

POWER DISTRIBUTION PANELBOARD

BACKGROUND OF THE INVENTION

This invention relates to power distribution panelboards that are particularly well suited for field assembly. It further relates to such panelboards which accept plug-in enclosed fusible switches and plug-in molded case circuit breakers in the same panelboard, and which further accept plug-in enclosed lug main units.

Panelboards are known which accept plug-in molded case circuit breakers of varying sizes and ratings, or which accept both enclosed fusible switches and circuit breakers when the circuit breaker is provided within a metallic box enclosure similar to the enclosure of the fusible switch. It is also known to provide panelboards which may be distributor stocked as separate parts and, to a limited extent, field assembled to one of several predetermined arrangements of circuit breakers and/or enclosed fusible switches. While the known panelboards have generally been satisfactory for their intended purposes, they have required distributors to maintain a large inventory of individual parts including factory assembled panels and main power feed devices. Additionally, versatility in the arrangement of circuit breakers and/or enclosed fusible switches has been limited.

SUMMARY OF THE INVENTION

This invention provides a panelboard which may be factory assembled or field assembled from relatively few distributor stocked parts to accommodate numerous arrangements of circuit breakers and/or enclosed fusible switches. The panelboard may comprise either single or double sets of bus bars to accommodate single or double rows of switches, circuit breakers or lug units. Double bus embodiments are electrically connected in parallel for increasing the electrical capacity of the panelboard by attaching a main circuit breaker, main switch or lug main unit which has plug-on connectors for connecting to corresponding bus bars of each set. Each breaker, switch or lug unit is electrically connected to the bus bars by a plug-on connection. Each device is further provided with at least one forwardly extending end structure to cooperate with a cover for the panelboard to provide a dead front for the panelboard. The panelboard has vertically spaced locating notches which cooperate with formations on the respective plug-on devices for locating the devices at incremented intervals along the panelboard. Latches carried by the plug-in devices cooperate with notches in mounting rails of an interior frame assembly of the panelboard to secure the respective unit in its plugged-on condition. Insulators for mounting bus bars of the panelboard are provided in a predetermined length to be arranged in a stacked, end-to-end relationship on the interior frame to provide overall lengthwise support for the bus bars in heights which are related to the incremented intervals for receiving the plug-on devices. The interior frame assembly may be reversed end-for-end to locate a neutral connector assembly, which is mounted thereto, at either the upper or lower end of the panelboard, and is arranged to receive wires horizontally for reducing the amount of wire bending space required within the panelboard. These and other features and advantages of the panelboard of this invention will become more readily apparent when reading the following description and claims in conjunction with the accompanying drawings.

DESCRIPTION OF THE PREFERRED EMBODIMENTS

Figure 1:
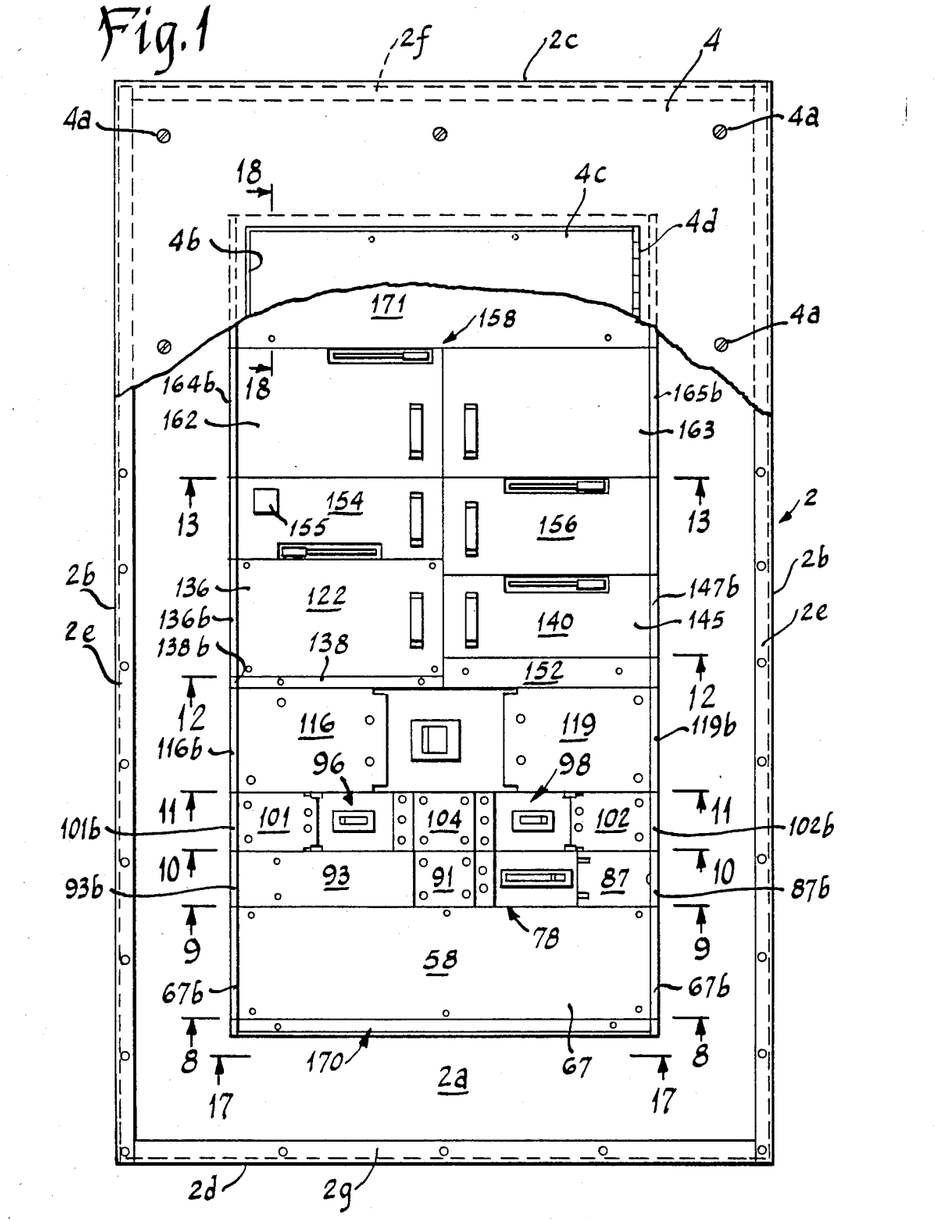
FIG. 1 is a front view of the panelboard of this invention with a front cover and door partially broken away from an enclosure of the panelboard.

A power distribution panelboard constructed in accordance with this invention is shown in front elevation in FIG. 1. The panelboard comprises a box-shaped enclosure 2 having a rear panel 2a from which side walls 2b, an upper wall 2c and a lower wall 2d extend forwardly to establish a predetermined depth for the enclosure. The forward ends of sidewalls 2b are formed over at right angles to provide forward flanges 2e. Similarly, upper wall 2c and lower wall 2d are formed over to provide forward flanges 2f and 2g, respectively. The flanges 2e, 2f and 2g establish an open front in a common plane for enclosure 2. A cover 4 is mounted to the front of enclosure 2 by a plurality of screw operated hidden trim clamps similar to the clamp disclosed in U.S. Pat. No. 3,116,081 issued Dec. 31, 1963 to L. G. Goodridge. These clamps, of which only the operating screws 4a are shown, engage the rear surfaces of flanges 2e, 2f and 2g to clamp cover 4 tightly against the front surfaces of the flanges. In an alternate embodiment (not shown) the cover may comprise separate upper, lower and side sections which are directly secured to the enclosure 2 by fasteners which extend through the cover sections and holes provided in the flanges 2e, 2f and 2g. Cover 4 has a central opening 4b which is provided with a door 4c attached to the cover by a hinge 4d along the right-hand edge.

Figure 2:
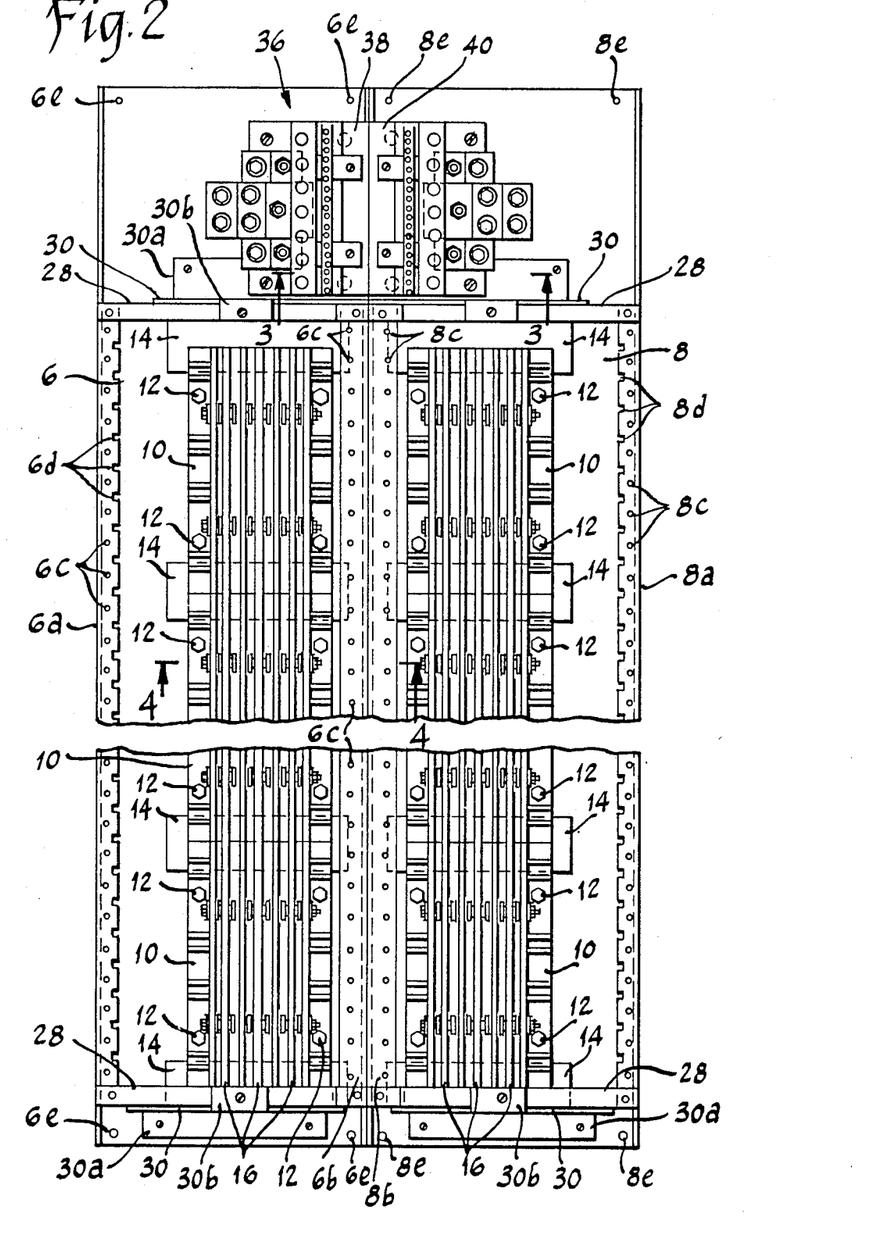
FIG. 2 is a front view of a twin interior frame assembly of the panelboard of this invention.
Figure 4:
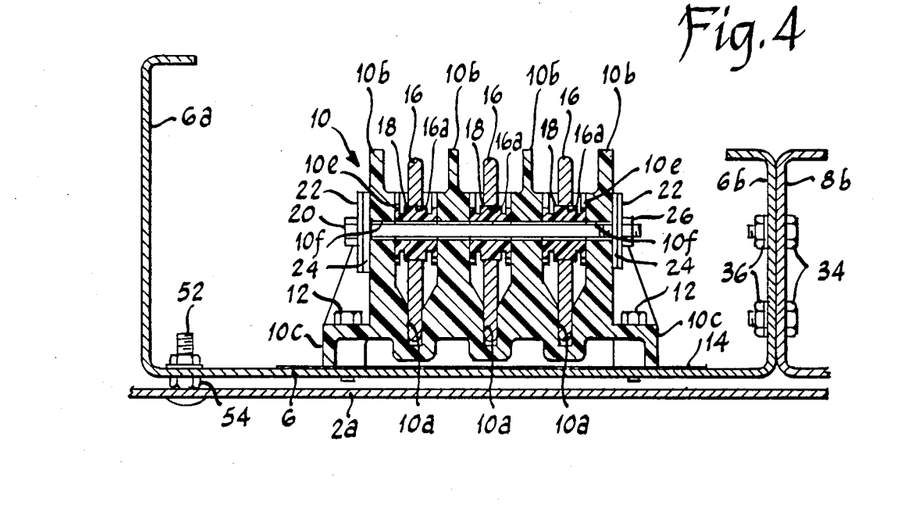
FIG. 4 is a cross-sectional view of a single interior frame assembly taken along the line 4—4 of FIG. 2 showing a set of bus bars mounted to a support insulator and the insulator mounted to the interior frame.
Figure 5:
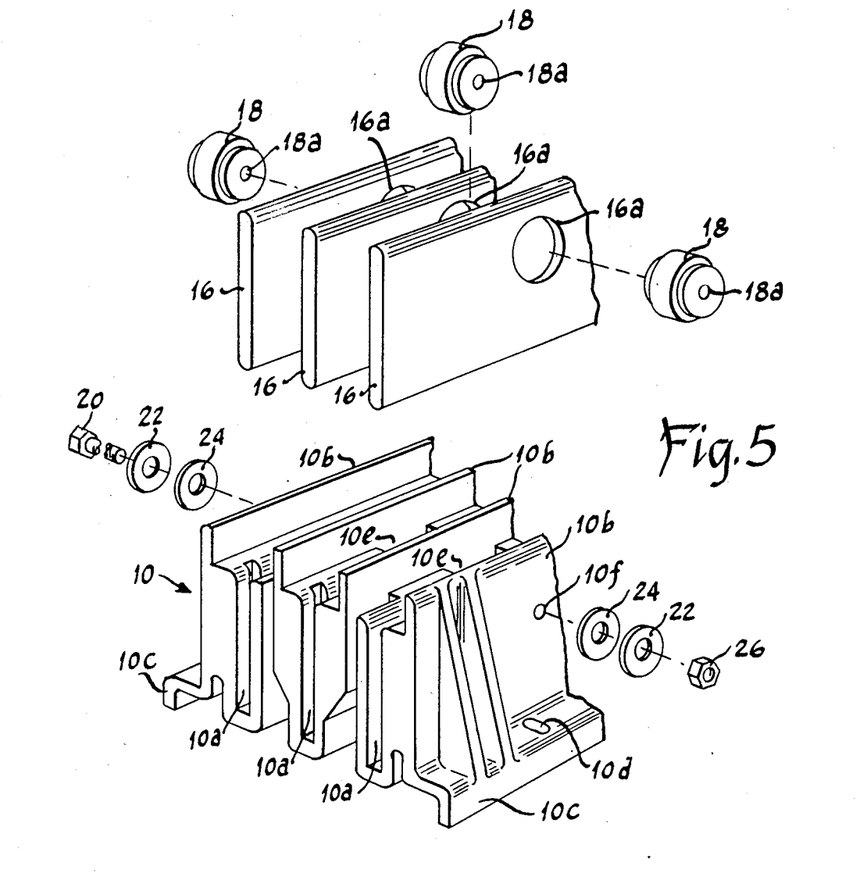
FIG. 5 is an exploded perspective view of a set of bus bars and a support insulator showing the method of assembling the bus bars within the support insulator.
Figure 6:
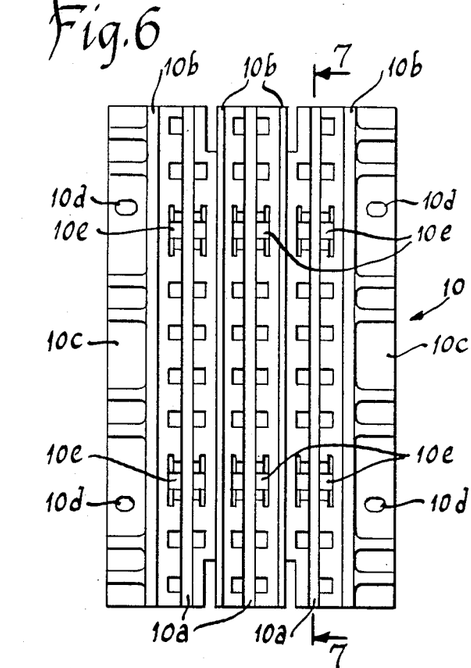
FIG. 6 is a top plan view of a support insulator.
Figure 7:
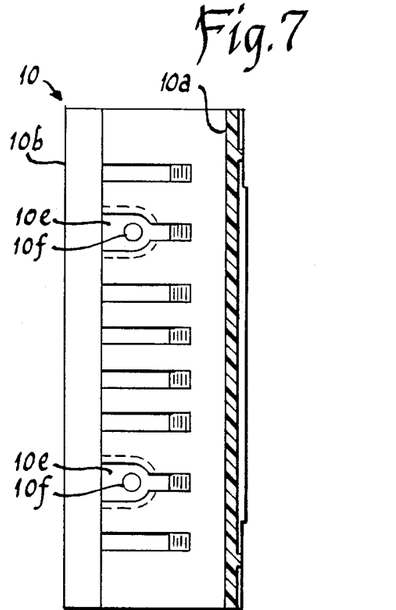
FIG. 7 is a cross-sectional view of the support insulator taken along line 7—7 of FIG. 6.

Prior to attaching the cover 4 to enclosure 2, an interior frame assembly is mounted to the rear panel 2a of the enclosure. A twin interior frame assembly is illustrated in FIG. 2. It comprises a left-hand sheet metal pan 6 and a right-hand sheet metal pan 8 formed as a mirror image to pan 6 about the vertical centerline of the twin frame assembly. Pan 6 will be described in detail, with like alpha suffixes given to corresponding elements of pan 8. Referring also to FIG. 4, pan 6 comprises an elongated, substantially planar member having an outer support rail 6a formed over to extend forwardly along the left-hand edge as viewed in FIG. 4 and an inner support rail 6b formed over to extend forwardly along the right-hand edge. The outer end of each support rail 6a and 6b has a right angle mounting flange extending toward the other support rail. Each flange is provided with a plurality of vertically spaced, horizontally aligned holes 6c (FIG. 2). The free edge of the flange of support rail 6a also is provided with a plurality of notches 6d spaced between the holes 6c.

A plurality of molded insulator supports 10 (FIGS. 2 and 4-7) are attached by screws 12 to the planar portion of pan 6 in end-to-end relation to extend along the length of the pan. The specific number of insulators 10 to be provided on the respective panel varies according to the desired size of the panelboard, that is, the number of devices or mounting increments desired. Referring to FIGS. 4-7, insulator support 10 has three laterally spaced deep grooves 10a extending end-to-end and open to the forward surface and the respective ends of the insulator. The forward surface is also provided with four forwardly projecting barrier ribs 10b extending end-to-end of the insulator and disposed on laterally opposite sides of grooves 10a. A pair of rearwardly extending lateral flanges 10c define a base for the insulator and contain clearance holes 10d (FIGS. 5 and 6) for receiving the screws 12 therethrough. The latter are preferably thread cutting screws which take into holes (not shown) in the pan 6. A flat strip 14 (FIG. 2) of insulating material is affixed to pan 6 adjacent respective ends of the support insulators 10 to provide electrical insulation between the pan and bus bars at the ends of the junctions of adjacent supports 10.

Three bus bars 16 are disposed within the respective aligned grooves 10a of supports 10. Bus bars 16 extend over the entire length of the adjacent support insulators 10. Bus bars 16 have holes 16a (FIG. 5) spaced along the length thereof to receive insulating bushings 18 therein. The bushings extend to each side of the respective bus bar 16 and may be provided with annular grooves for increasing the surface distance for electrical creepage protection. The upper surface of insulator 10 is provided with pockets 10e communicating with each groove 10a. Pockets 10e are semi-cylindrically formed complemental to the bushings 18 and have tangential straight sides open to the forward surface of insulator 10 to permit insertion of bushings 18 therein from the front of the insulator. A transverse hole 10f is provided in insulator 10 at each aligned group of pockets 10e, the hole 10f being concentric with the axis of the semi-cylindrical pockets and extending entirely through the insulator from one lateral exterior surface to the other. The bus bars 16, with bushings 18 inserted within the respective holes 16a, are inserted into the respective aligned grooves 10a of insulators 10 such that the projecting ends of bushings 18 are received within pockets 10e. Subsequently, bolts 20 having a flat metallic washer 22 and a rubber washer 24 disposed thereon adjacent the head of the bolt, are inserted through respective holes 10f and aligned holes 18a (FIG. 5) in bushings 18. A second flat washer 22 and rubber washer 24 are placed over the projecting end of each bolt 20 and a nut 26 is threaded thereon to clamp the walls of insulator 10 and bushings 18 tightly together, securing bus bars 16 within the insulator 10. When so assembled, the forward edges of bus bars 16 are disposed between ribs 10b (FIGS. 4 and 5) and recessed rearwardly from the forward edge of the ribs to reduce the likelihood of conductive objects accidentally bridging the bus bars.

Referring to FIG. 2, a metal bracket 28 is attached across the flanges 6a and 6b at the upper and lower ends thereof. Fiberboard insulators 30 each having a rear, right-angled flange 30a attached to pan 6, extend forwardly to the respective bracket 28 at the upper and lower ends of the bus bar and insulator support assembly. Insulators 30 each have a forward flange 30b which overlies bracket 28 and is attached thereto. The insulators 30 electrically protect the ends of bus bars 16 from accidental contact by foreign conductive objects.

The interior frame assembly comprising pan 6 and the aforedescribed components assembled thereto may be mounted within enclosure 2 when a panelboard having a single vertical row of switch, circuit breaker or lug unit components is desired. However, to increase the capacity of the panelboard to accept a greater number of devices or a greater current disbribution, a double, or twin interior frame assembly may be provided (such as that actually illustrated in FIG. 2) which will accept two side-by-side vertical rows of plug-on devices or twin size devices which extend across the twin interior. Moreover, the capacity to accept additional units may also be expanded by selecting an enclosure, cover assembly, and interior frame assembly which is longer than that illustrated herein, and providing additional insulator supports 10 to accommodate longer bus bars 16.

As hereinbefore mentioned, right-hand pan 8 is formed as a mirror image to pan 6. It has an outer support rail 8a along the right-hand edge thereof and an inner support rail 8b along the left-hand edge thereof as viewed in FIG. 2, each rail containing holes 8c and the outer rail having notches 8d corresponding to holes 6c and notches 6d. An insulator support 10 and bus bar 16 assembly identical to that aforedescribed is attached to the flat planar portion of pan 8. Brackets 28 and fiberboard insulators 30 are similarly attached to pan 8. To provide a twin interior frame assembly such as that shown in FIG. 2, the inner support rails of pans 6 and 8 are bolted together along their length by bolts 34 and nuts 36 extending through mating clearance holes in the respective inner rails (FIG. 4), thereby to establish a rigid, unitary assembly.

Figure 3:
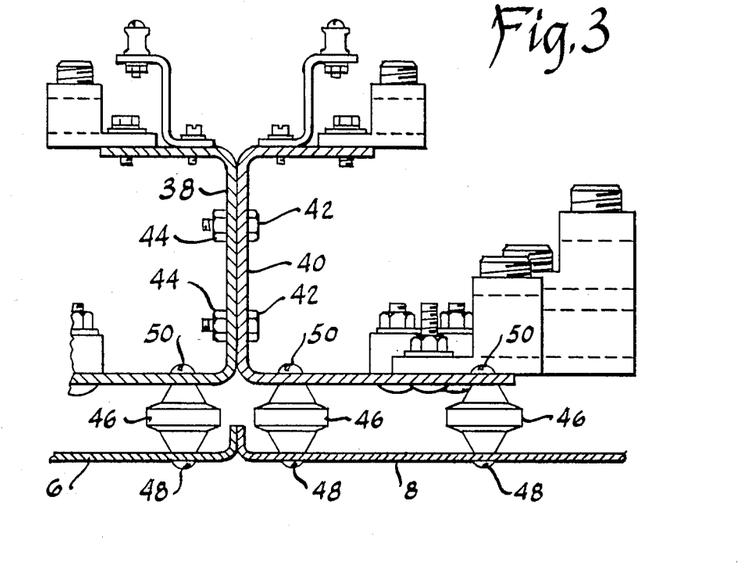
FIG. 3 is a cross-sectional view of a neutral connector assembly of the panelboard of this invention taken along the line 3—3 of FIG. 2.

The flat planar portions of pans 6 and 8 extend upwardly beyond the upper ends of support rails 6a, 6b 8a and 8b to provide a mounting surface for a neutral connector assembly 36 (FIGS. 2 and 3). This neutral connector assembly comprises a left-hand connector plate 38 and a right-hand connector plate 40, each having a plurality of commercially available lugs arranged thereon. Plates 38 and 40 may be used individually with a respective pan 6 or 8 to provide a neutral connector for a single unit, or may be joined back-to-back by bolts 42 and nuts 44 as seen in FIG. 3 to form a twin neutral connector unit 36 for the twin interior frame assembly of FIG. 2. Electrically insulating bushings 46 are attached to the pans 6 and 8 by screws 48, and the plates 38 and 40 are attached to the forward ends of bushings 46 by screws 50 to mount the neutral connector 36 to the twin interior frame assembly. The wire receiving openings of all of the lugs of neutral connector 36 are directed toward the respective outer lateral edges of the interior frame assembly. Wires are brought into the panelboard through openings in the top wall 2c located near the respective sidewalls 2b. Such wires thus require only a single ninety degree bend to be directed into the openings of the lugs of neutral connector assembly 36, thereby reducing the vertical wiring space necessary for wire bending at the end of the interior frame assembly over embodiments in which the lug openings are vertically oriented which thereby require sequential ninety degree bends to be received in the lug openings.

The interior frame assembly is mounted within enclosure 2 by four carriage bolts 52 (FIG. 4) which project forwardly through holes in the rear panel 2a of the enclosure and are secured by nuts 54. Each pan 6 and 8 is provided with clearance holes 6e and 8e (FIG. 2) at the four corners thereof. When a single interior frame assembly is utilized, it is placed over the carriage bolts 52 so that the pan rests against the nuts 54 and is secured thereto by nuts 56 threaded onto bolts 52. When a twin interior unit is utilized, the bolts 52 are arranged to project through the holes 6e and 8e adjacent the respective edges containing outer rails 6a and 8a, and the holes adjacent the inner rails are not used. It is also possible to invert the interior frame assembly whereby the neutral connector assembly 36 will be located at the bottom of the panelboard when so desired.

Figure 8:
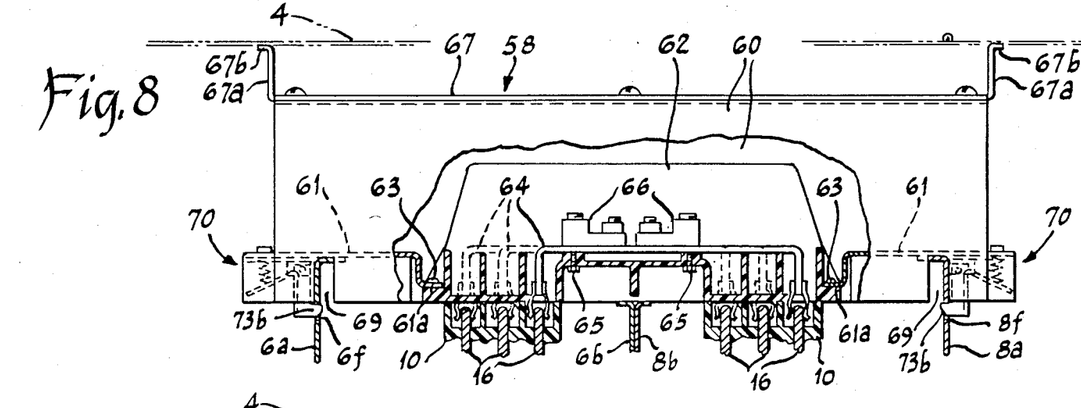
FIG. 8 is a cross-sectional view taken along line 8—8 of FIG. 1 showing a plug-on lug main unit having electrical connection with each bus bar set of a twin interior frame for electrically connecting the respective bus bar sets in parallel.

A single interior frame panelboard may be connected to a source of electric power as an 800 amp panelboard. The twin panelboard illustrated in the drawings may be electrically connected as a 1200 amp panelboard. As shown in FIG. 8, a 1200 amp lug main twin unit 58 is attached to the interior frame assembly across both outer support rails 6a and 8a. Lug main unit 58 comprises a sheet metal enclosure having a pair of sides 60 welded to a pair of mounting plates 61 at opposite ends. Mounting plates 61 have inwardly directed flanges 61a to which a molded insulator block 62 is mounted by screws 63. Three elongated U-shaped conductive straps 64 having plug-on connectors at each end are mounted within insulator block 62 by screws 65. The ends of each strap 64 align with one of the bus bars 16 of pan 6 and a corresponding bus bar 16 of pan 8 to electrically interconnect the respective corresponding bus bars of each set when lug main unit 58 is plugged into place. Each conductor strap 64 has a pair of wire receiving lug connectors 66 attached thereto for receiving incoming electrical supply wires (not shown). The forward edges of sides 60 are formed over at right angles to provide flanges against which a sheet metal cover 67 is attached by a plurality of screws. The ends 67a of cover 67 project forwardly and have outwardly extending flanges 67b formed thereon to abut against the interior surface of cover 4 when the latter is installed for reasons which will be described later in this description.

To facilitate mounting main lug unit 58 and other devices to the panelboard, the panelboard is divided into increments determined by the pole-to-pole dimension of the molded case circuit breakers utilized on the panelboard. This dimension is herein referred to as "x". With reference to FIG. 2, the vertical spacing between adjacent notches 6d along support rail 6a is "x", as is the spacing between adjacent holes 6c along rails 6a and 6b. The lug main unit 58 requires a 7x space, i.e. the vertical dimension of the enclosure from one side member 60 to the other is equal to seven of the x increments. The rear edges of side members 60 are provided with slots 69 for receiving support rails 6a and 8a at respective notches 6b and 8b, thereby to provide a means of locating a device such as the plug-on lug main unit 58 on the interior frame assembly when installing the device.

Figure 14:
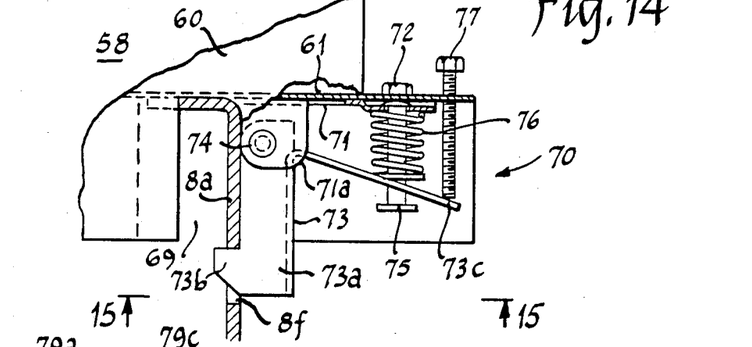
FIG. 14 is a side elevation view of a latch assembly of the plug-on devices showing a segment of the device and the panelboard interior frame in cross-section.
Figure 15:
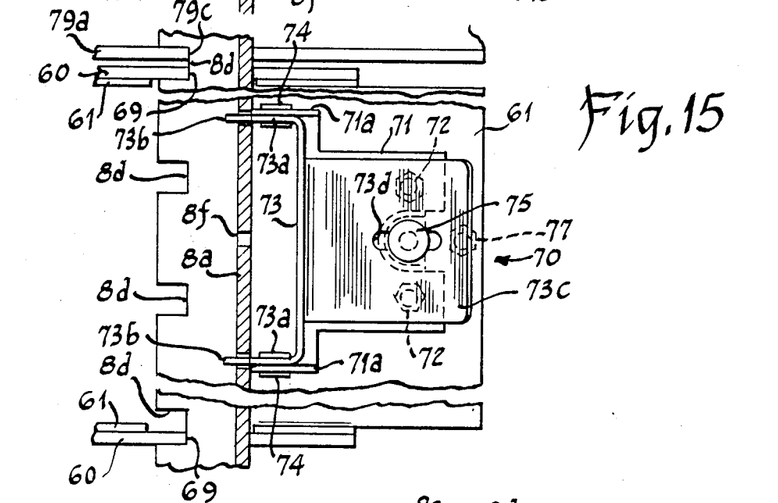
FIG. 15 is a bottom view of the latch assembly of FIG. 14 taken in the direction of arrows 15—15 and showing a portion of the panelboard interior frame in cross-section.

To further facilitate mounting of lug main unit 58 and other devices to the panelboard, each device is provided with at least one latch assembly 70. Twin size devices such as lug main unit 58 which extend across the entire width of a twin interior frame assembly from rail 6a to rail 8a are provided with a latch assembly 70 at each end. Devices which mount only to a single interior frame assembly, or to only one panel 6 or 8 of the twin interior frame assembly, have a single latch 70 as will be seen in later description. The details of latch assembly 70 are more clearly shown in FIGS. 14–16. Referring specifically to FIG. 14, the right-hand end of lug main unit 58 is shown in enlarged detail. A portion of side member 60 is broken away to the right of slot 69, showing mounting plate 61 in cross-section. FIG. 15 shows the latch assembly 70 when viewed from the back, or underside with respect to the orientation of FIG. 14, as represented by lines 15—15 in FIG. 14.

Latch assembly 70 comprises a T-shaped mounting bracket 71 which is attached against the flat surface of mounting plate 61 by a pair of screws 72. The outer ends of the cross bar portion of T-shaped mounting bracket 71 are formed over at right angles to provide depending ears 71a. An operating bracket 73 is pivotally mounted between the ears 71a by a pair of riveted pins 74. As viewed from the underside in FIG. 15, the operating bracket 73 is a shallow U-shaped channel member. The opposite legs 73a of bracket 73 are pivotally connected to the ears 71a near the upper ends of the respective legs by the pins 74, and extend downwardly along the outer surface of rail 8a. The lower end of each opposite leg 73a has an inwardly directed hook 73b formed thereon, the lower inward corner of which is beveled to serve as a cam surface as will later be described. An integrally formed release arm 73c extends angularly away from the central portion of bracket 73 to project outwardly and angularly away from bracket 71 and mounting plate 61. A headed pin 75 is inserted through an elongated slot 73d in release arm 73c and through a hole (not shown) in a recessed portion of mounting bracket 71. The upper end of pin 75 is riveted over prior to attachment of the latch assembly 70 to mounting plate 61 to retain pin 75 assembled to bracket 71. Attachment of the latch assembly 70 to mounting plate 61 traps the riveted-over end of pin 75 between plate 61 and the recessed portion of bracket 71. A helical compression spring 76 is disposed over the shank of pin 75 between bracket 71 and release arm 73c to bias hook 73b toward rail 8a.

Figure 16:
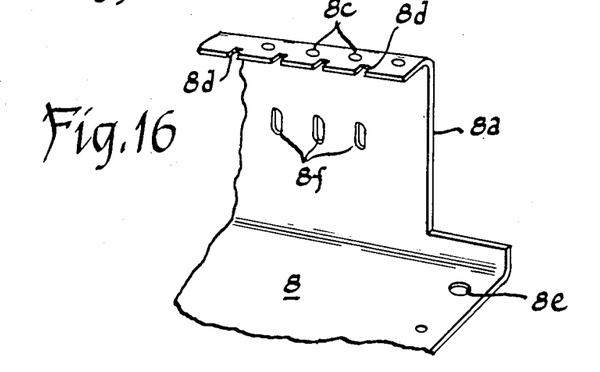
FIG. 16 is a perspective view of a fragmentary portion of the interior frame showing locating notches and latch openings therein.

To attach plug-on lug main unit 58 to the interior frame assembly, an installer may grasp the mounting plates 61 at each end of the unit and position the rear edges of sides 60 against the rails 6a and 8a such that slots 69 align with corresponding pairs of notches 6d and 8d. The sides 60 may rest on the lower surfaces of the respective notches, as seen in FIG. 15, thereby accepting the weight of the device. The installer then pushes the unit inwardly to engage the plug-on connectors of straps 64 with the respective bus bars 16. In so doing, the cam surfaces of hook portions 73b of the latch assemblies 70 engage the rounded outer corner of support rails 6a and 8a to cam the operating brackets 73 against the bias of springs 76. As best seen in FIGS. 14 and 16, support rails 6a and 8a are provided with a plurality of slots 6f and 8f in the forwardly extending legs thereof which receive hook portions 73b when the upper or forward ends of slots 69 seat firmly against the forward flanges of support rails 6a and 8a. When the hook portions 73b snap into the slots 6f and 8f, the installer knows that the unit is properly and fully attached to the interior frame assembly. Moreover, the hooks retain the unit in this fully attached position. To lock the unit to the interior frame, a bolt 77 is threadably inserted into a tapped hole in each mounting plate 61 and is advanced inwardly until the end abuts the upper surface of release arm 73c to prevent the operating bracket from being rotated away from the respective support rail to withdraw the hook portions 73b from slots 6f and 8f. Bolt 77 may be threaded outwardly of mounting plate 61 and away from release arm 73c when it is desired to remove the unit from the interior frame assembly, and the installer may then release the hook portions 73b by grasping the underside of release arm 73c together with mounting plate 61 and rotating the operating bracket 73 to release the hook portions 73b by pulling outwardly on the release arm and the mounting plate 61.

Figure 9:
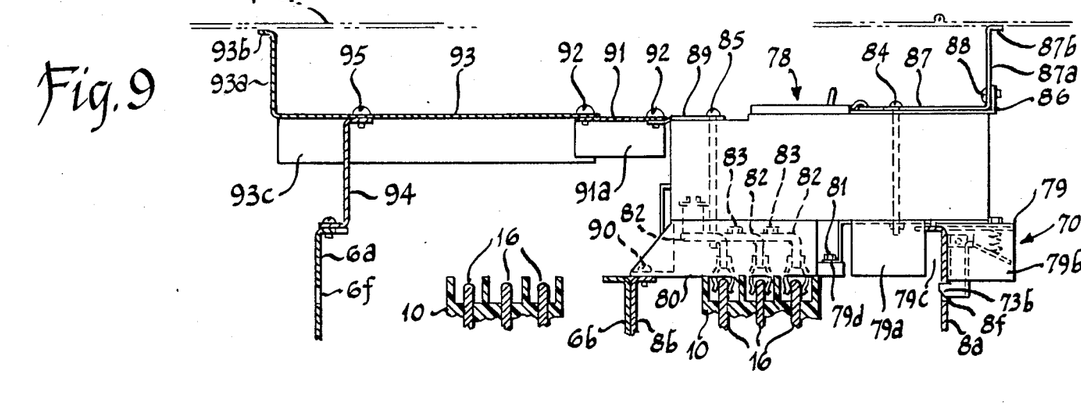
FIG. 9 is a cross-sectional view taken along line 9—9 of FIG. 1 showing a single molded case circuit breaker mounted to the right interior frame assembly and a filler plate arrangement for the single circuit breaker.

Referring to FIGS. 1 and 9, a single, three-pole molded case circuit breaker 78 is mounted in the segment immediately above lug main unit 58. Circuit breaker 78 may, by example, be a 600 volt, 100–225 amp breaker, however the details of the breaker are not significant to this invention. To conserve vertical mounting space on the panelboard, circuit breakers are not mounted within a metal enclosure similar to that of the enclosed fusible switch devices to be described later, but instead are provided with a mounting assembly for attaching the breaker directly to the interior frame assembly. A mounting assembly for breaker 78 comprises a mounting plate 79 having a first pair of depending sides 79a and a second pair of depending sides 79b (only one of each of the sides being visible in FIG. 9) spaced from sides 79a to form a slot 79c similar to slot 69 (FIG. 8) between the respective adjacent sides. The upper surface of mounting plate 79 is stepped upward in the area of the forward flange of support rail 8a to raise the forward surface of the breaker 78 to a predetermined depth with respect to the front of the panelboard. The left-hand end of mounting plate 79 (as viewed in FIG. 9) has a depending leg terminating in a right-angle flange 79d. An insulating molding 80 is attached to flange 79d by screws 81. Molding 80 provides support and electrical isolation for three conductor straps 82 which are electrically secured to terminals of breaker 78. Straps 82 are of different lengths and are formed downwardly away from the breaker at their unsecured ends to align with respective ones of the bus bars 16 in pan 8. Screws 83 secure the longer two of the three straps 82 to insulating molding 80 to provide additional support for the straps. The unsecured ends of straps 82 are provided with plug-on connectors for engaging bus bars 16. Mounting plate 79 and attached molding 80 are attached to the rear surface of circuit breaker 78 by pairs of screws 84 and 85, respectively, which extend through holes in the molded case of circuit breaker 78. Screws 84 extend through holes in mounting plate 79 to receive nuts on their projecting ends. Screws 85 extend into holes in molding 80 and threadably engage tapped inserts in the molding. Screws 84 also secure a filler plate support bracket 86 to the front surface of breaker 78. An L-shaped filler plate 87 having a forwardly projecting outer end 87a which terminates in a right angle flange 87b is pivotally attached to support bracket 86 adjacent the inner end of bracket 86. A screw 88 is inserted through a hole in end 87a to threadably engage an aligned hole in a flange of bracket 86 to secure the filler plate 87 in position on the bracket. Screws 85 also secure a center filler plate support bracket 89 to the forward surface of breaker 78. A latch assembly 70 is attached to mounting plate 79 in the manner described above in conjunction with mounting plates 61.

Breaker 78, being a three-pole device, requires a 3x segment on the interior frame assembly. The breaker is plugged onto the interior frame assembly by grasping the mounting plate 79 and the opposite end of the breaker, aligning the respective slots 79c with a notches 8d in support rail 8a one of which is partially occupied by the side member 60 of lug main unit 58, as seen in FIG. 15, and another notch 8d located three increments above the unit 58. The width of notches 8d are made to accommodate the thickness of material of two mounting plates or side plates. The breaker 78 is then pushed onto the interior frame until the forward end of slot 79c firmly seats against the forward flange of support rail 8a whereupon the hooks 73b of latch 70 snap into the corresponding slots 8f of support rail 8a and the left-hand end of insulating molding 80 rests upon inner support rail 8b. Screws 90 extend through holes in the left-hand end of molding 80 to thread into respective holes 8c in the forward flange of rail 8b to secure that end of the breaker unit, and screws 77 (FIG. 14) may be threaded inwardly to lock the latch end of the unit in place.

The space on panel 6 immediately across from circuit breaker 78 is unoccupied in the exemplary embodiment illustrated in the drawings. A center filler plate 91 is attached to bracket 89 by a pair of screws 92. Another filler plate 93 is attached to the free end of center filler plate 91 by another pair of the screws 92 and to a pair of forwardly projecting Z-shaped brackets 94 by a pair of screws 95. Brackets 94 are mounted on the forward flange of support rail 6a. The outer end of filler plate 93 has a forwardly projecting leg 93a which terminates in a right angle flange 93b. Filler plates 91 and 93 have rearwardly extending sides 91a and 93c, respectively, for closing off the space when adjacent devices have a greater panel depth from cover 4.

Figure 10:
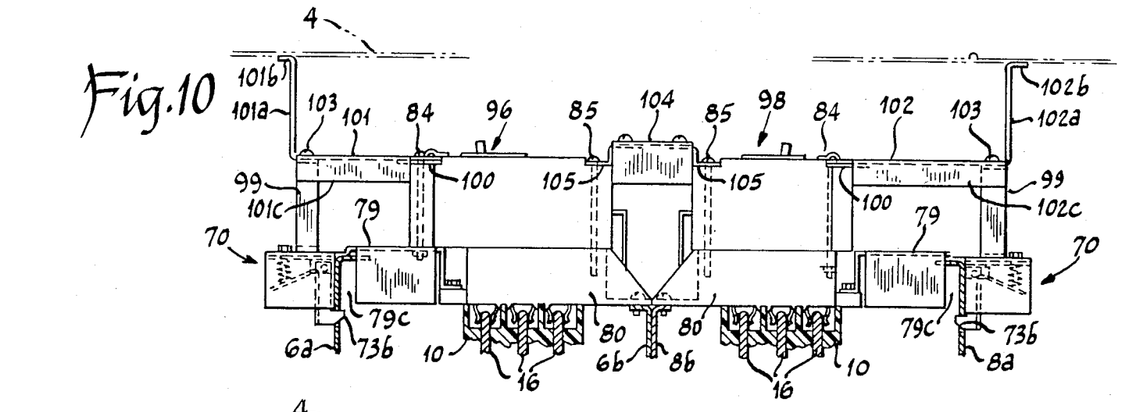
FIG. 10 is a cross-sectional view taken along line 10—10 of FIG. 1 showing a pair of molded case circuit breakers mounted to the respective left and right interior frames of the twin interior frame assembly.

Referring to FIGS. 1 and 10, another arrangement of circuit breakers is provided in the segment immediately above circuit breaker 78. In FIG. 10, the left-hand pan 6 has a 240 volt, 100–225 amp type CHH molded case circuit breaker 96 mounted thereon, while the right-hand pan 8 has a 240 volt, 100–225 amp type CC molded case circuit breaker 98 mounted thereon. These breaker unit assemblies are similar to breaker 78 in that they each are mounted to a support assembly comprising molding 80 and mounting plate 79 in the manner afore-described except that breaker 98, being somewhat shorter than breakers 78 and 96, has both ends attached to molding 80 by respective screws 84 and 85. The hinged filler plates 101 and 102 for this pair of breakers are also different from that for breaker 79. Z-shaped brackets 99 are mounted on the forward surface of each mounting plate 79 in aligned pairs with only the near side brackets being visible in FIG. 10. The support brackets 100 for the hinged filler plates 101 and 102, respectively, of breakers 96 and 98 do not extend fully to the outside of the panel as did support bracket 86. Thus, the filler plates 101 and 102 are hingedly supported by brackets 100 adjacent their respective inner ends and are secured to the forward flanges of brackets 99 by screws 103 adjacent their outer ends. The outer ends 101a and 102a, respectively, of filler plates 101 and 102 extend forwardly and terminate in right angle flanges 101b and 102b, respectively. Breakers 96 and 98 are individually mounted to the interior frame assembly in the manner aforedescribed in conjunction with circuit breaker 78. Both breakers require 3x segments on the panelboard. When so assembled, a center filler plate 104 is secured to center filler plate brackets 105 which are attached to the respective breakers by screws 85. Breakers 96 and 98 have less height than breakers 78 and therefore center filler plate 104 is elevated above the surface of the breakers to maintain a common level between the filler plates 92 and 104. Each of the filler plates 101, 102 and 104 has pairs of rearwardly extending sides 101c, 102c and 104a respectively, for accommodating different panelboard depths of adjacent devices.

Figure 11:
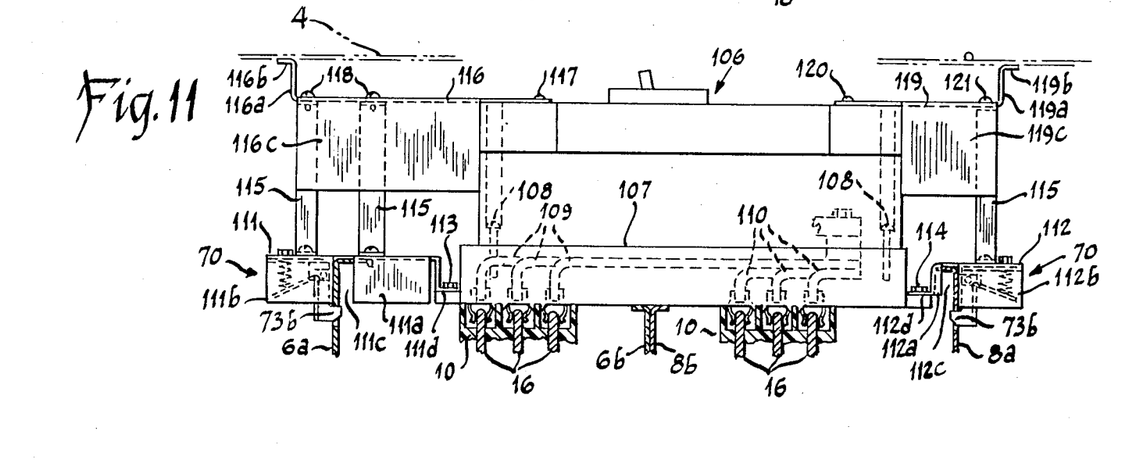
FIG. 11 is a cross-sectional view taken along line 11—11 of FIG. 1 showing a molded case circuit breaker embodied in a twin plug-on unit which mounts across both sides of the twin interior frame assembly and electrically connects to both sets of bus bars.

Referring next to FIGS. 1 and 11, a 600 volt, 400 to 800 amp type M molded case circuit breaker 106 is mounted in the next available segment above circuit breakers 96 and 98. In view of the physical size of this breaker, it is arranged as a twin unit, attaching to both support rails 6a and 8a. In view of the electrical capacity of breaker 106, it is arranged to plug onto both sets of bus bars 16 in electrical parallel. A molding 107 is attached to the underside of breaker 106 by screws 108 which extend through recessed holes in the molded case of breaker 106 and take into threaded inserts in molding 107. Molding 107 provides support and electrical isolation for three conductive straps 109 which are connected to the respective terminals of the three-pole breaker. The ends of straps 109 are formed down to be in alignment with the respective bus bars 16 of left-hand pan 6 and each have plug-on connectors attached thereto for making electrical connection with those bus bars. Short conductive straps 110 are attached to straps 109, the ends of which are turned down to be in alignment with a respective corresponding bus bar 16 of right-hand pan 8. The ends of straps 110 have plug-on connectors attached thereto for making electrical connection with the respective last mentioned bus bars. When mounted to the interior frame assembly, the respective straps 109–110 and their attached connectors afford a parallel electrical connection from corresponding bus bars of each set thereof to a respective terminal of the breaker. As may be seen in FIG. 11, breaker 106 is mounted off-center with respect to the twin interior frame assembly. Accordingly, two separate mounting plates 111 and 112 are utilized with this breaker. Mounting plate 111 has a first pair of sides 111a and a second pair of sides 111b spaced lengthwise of the unit to define a slot 111c for receiving the support rail 6a at respective notches 6d. A latch assembly 70 is attached to the mounting plate 111 at the left-hand end thereof as viewed in FIG. 11. The right-hand end of mounting plate 111 has a depending leg which terminates in a right-angle flange 111d which attaches to molding 107 by screw 113. Mounting plate 112 has a first pair of short side members 112a and a second set of side members 112b spaced lengthwise of the unit to define a slot 112c for receiving the support rail 8a at respective notches 8d. A latch assembly 70 is attached to support plate 112 at the right-hand end thereof as viewed in FIG. 11, and the left-hand end thereof is provided with a depending leg terminating in a right-angle flange 112d which is attached to molding 107 by screw 114. Two pairs of elongated C-shaped brackets 115 are utilized with this unit, a first pair being located in spaced, laterally aligned relation and secured to mounting plate 112 so that only the near side bracket is visible in FIG. 11. The second pair is attached to mounting plate 111 in spaced, but laterally staggered relation. A filler plate 116 is attached directly to the front surface of breaker 106 by screws 117 at the left-hand end thereof and to the forward flanges of brackets 115 by screws 118. Filler plate 116 has a forwardly projecting end 116a terminating in a right-angle forward flange 116b and rearwardly extending sides 116c. Another filler plate 119 is attached directly to the front surface of breaker 106 by screws 120 and to the forward flanges of brackets 115 by screws 121. Filler plate 119 has a forwardly projecting end 119a terminating in a right-angle forward flange 119b and rearwardly extending sides 119c.

Breaker unit 106 is attached to the twin interior frame assembly in the manner aforedescribed in conjunction with lug main unit 58 so as to cause the hooks 73b of both latch assemblies 70 to engage the respective slots 6f and 8f of support rails 6a and 8a. When so engaged, the molding 107 rests upon the inner flanges 6b and 8b to provide additional support for the unit.

Figure 12:
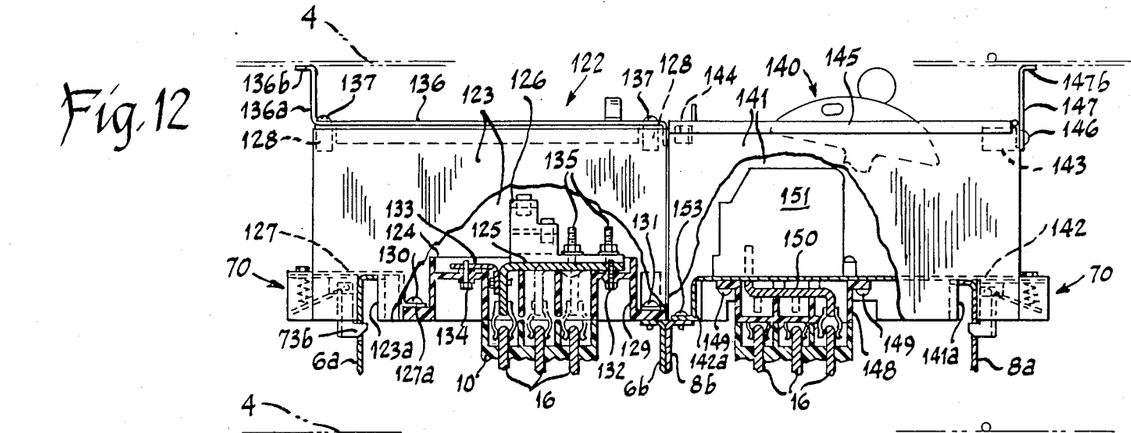
FIG. 12 is a cross-sectional view taken along line 12—12 of FIG. 1 showing a fusible switch unit mounted to the right side of the twin interior frame assembly and a lug unit mounted to the left side of the twin interior frame assembly across from the above mentioned switch unit.

Referring to FIGS. 1 and 12, two additional types of devices are shown. The device on the left in FIG. 12 is a three-pole lug unit 122 wherein unprotected electric power may be taken from the panelboard and distributed via wiring to another panelboard, protected device or the like. Lug unit 122 comprises a pair of side plates 123, the near side being partially broken away to show an insulator 124, conductive strap 125 and connector lug 126 of one pole. Side plates 123 are joined in spaced relation by a mounting plate 127, similar to mounting plate 61, to which the side plates are welded at their lower left-hand corner, a pair of upper braces 128 welded between the side plates at the opposite upper corners, and a lower brace 129 welded between the side plates at the lower right-hand corners of the side plates. Three separate identical insulators 124 are used in the lug unit 122, each attached at one end to a flange 127a of mounting plate 127 by screws 130 and at the opposite end to lower brace 129 by screws 131. An L-shaped conductive strap 125 is secured to the insulator 124 by a pair of screws 132, only one of which is shown in FIG. 12. The short leg of strap 125 depends through one of three openings in insulator 124 and in alignment with one of the bus bars 16. Similarly to the previously described devices, the depending leg of strap 125 has a plug-on connector attached thereto for electrical connection with the bus bar. The longer two of the three straps 125 are further provided with L-shaped support brackets 133 attached to the depending leg and extending across the upper surface of insulator 124. Screws 134 secure the brackets 133 to the insulator 124. Each conductive strap 125 is provided with a pair of upstanding screws 135 for securing the wire connector lug 126 thereto. A cover 136 having a forwardly extending end 136a and a right-angle forward flange 136b is attached to the top of lug unit 122 by screws 137 located at the respective corners of the cover and which take into openings in the upper braces 128. A latch assembly 70 is attached to mounting plate 127. Sides 123 are provided with slots 123a similar to slots 69 in FIG. 8, for receiving support rail 6a at respective notches 6d.

Lug unit 122 is an 8x unit, that is, it requires eight increments along the vertical dimension of the support rail for mounting purposes. As may be seen in FIG. 1, lug unit 122 is not mounted immediately adjacent circuit breaker 106 but is spaced one x increment above that breaker. A single increment filler plate 138 is mounted in the space between lug unit 122 and circuit breaker 106, the filler plate 138 being similar to filler plate 93 shown in FIG. 9 except that an additional bracket is required to be mounted on inner support bracket 6b to support the inner end of filler plate 138. The mounting details of this filler plate have not been specifically shown. Lug unit 122 is mounted in the aforedescribed manner and the right-hand or inner end is attached to inner rail 6b by a pair of screws extending through the outermost two insulators 124 and lower brace 129 to be received in holes 6c in the forward flange of rail 6b.

A three-pole 30 amp enclosed fusible switch 140 is mounted on right-hand pan 8 in FIG. 12 across from lug unit 122. Switch 140 comprises a pair of sides 141 welded to a mounting plate 142. Unlike previously described mounting plates, the plate 142 extends fully across the bottom of switch 140. The left-hand or inner end of mounting plate 142 has a depending leg which terminates in a flange 142a. A cross-brace 143 is welded between sides 141 at the upper right-hand corner and a second crossbrace 144 is welded between the sides 141 at the upper left-hand corner. A hinged cover 145 is attached to the enclosure by securing one leg of the hinge to brace 143 by a plurality of screws 146. An upwardly projecting bracket 147 having a forward flange 147b is also attached to brace 143 at the exterior of the enclosure. A latch assembly 70 is attached to mounting plate 142 at the outer or right-hand end. Sides 141 have slots 141a formed therein similar to slots 69 to receive support rail 8a at respective notches 8d. A molding 148 is attached to the underside of mounting plate 142 by screws 149. insulator 148 electrically isolates and supports three conductive straps 150 leading from terminals of a three-pole disconnect switch 151, the details of which have not been shown. Each of the straps 150 are formed downwardly at one end in alignment with the respective bus bars 16 of pan 8 and have plug-on connectors attached thereto for making electrical connection with the bus bars.

Switch 140 requires a 5x segment along the vertical dimension of the interior frame assembly. As may be seen in FIG. 1, switch 140 is spaced above the circuit breaker 106 by a 3x segment, and the space therebetween receives a 3x wide filler plate 152 mounted on rails 8a and 8b in the same manner as described for filler plate 138. Switch 140 is mounted to the interior frame assembly in the aforedescribed manner, with the flange 142a being secured to the forward flange of rail 8b by screws 153.

Referring to FIG. 1, a 60 amp three-pole enclosed fusible switch 154 is mounted immediately above lug unit 122, this switch requiring a 5x segment on the interior frame. A 100 amp, three-pole enclosed fusible switch 156 is mounted across from switch 154 immediately above switch 140, this switch requiring a 6x segment on the interior frame. Apart from the relative size and rating differences in these devices, switches 154 and 156 are essentially identical to switch 140 and have not been shown separately. Switch 154 is provided with a blown fuse indicator device 155 mounted to the front cover thereof. The blown fuse indicator 155 is like that described and claimed in U.S. Pat. No. 4,691,197 issued Sept. 1, 1987 in the names of Michael A. Damiano and Richard F. Schmerda entitled "Blown Fuse Indicator" and assigned to the assignee of this invention. Indicator 155 provides an illuminated identification of the specific fuse in switch 154 which is blown when such fault occurs.

Figure 13:
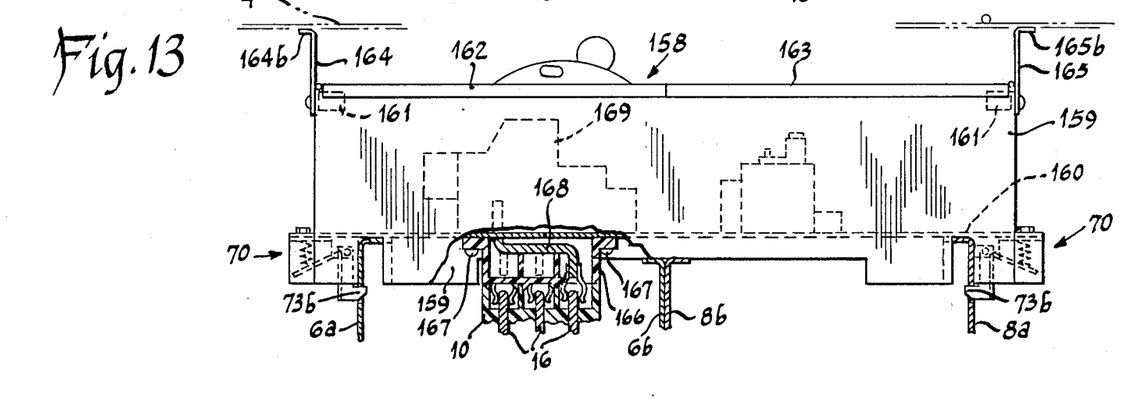
FIG. 13 is a cross-sectional view taken along line 13—13 of FIG. 1 showing a twin fusible switch unit which mounts across both sides of the twin interior frame assembly, but electrically connects to only one set of bus bars.

With reference to FIGS. 1 and 13, a 200 amp, three-pole twin size enclosed fusible switch 158 is mounted immediately above switches 154 and 156. This unit is similar to switches 140, 154 and 156 except that it occupies the entire width of the twin interior frame assembly. It comprises a pair of sides 159 welded along their bottoms to a mounting plate 160 which extends for the full length of the unit. A pair of cross braces 161 indentical to braces 146 are welded between sides 159 at opposite upper corners thereof. A pair of hinged covers 162 and 163 are respectively attached to the cross braces and upright brackets 164 and 165 having forward flanges 164b and 165b are also attached to the exterior of the cross braces in the same manner as cover 145 and bracket 147 are attached to brace 143. An insulator 166 is attached to the underside of mounting plate 160 by screws 167 to support and electrically isolate conductive straps 168 leading from a three-pole disconnect switch 169. A pair of latch assemblies 70 are attached to the mounting plate 160 at the respective ends thereof. Switch unit 158 requires a 7x segment along the interior frame assembly and is installed in the manner aforedescribed in conjunction with twin size devices such as lug main unit 58 and circuit breaker 106.

As seen in FIG. 1, the interior frame assembly of the panelboard of this invention will accept a flexible arrangement of plug-on devices. It is preferable that circuit breakers of the same x increment requirement be mounted across from each other, and that circuit breakers not be mounted across from enclosed fusible switch devices or lug devices. When separate enclosed switch devices or lug units are mounted across from each other, their vertical dimension along the panelboard does not need to be equal. Each device is provided with at least one forwardly projecting leg and right angle forward flange such as 67a-67b, 87a-87b, 93a-93b, 101a-101b, etc., to form a dead front barrier around the periphery of the panelboard when the cover 4 is assembled to the enclosure 2. To complete the dead front barrier at the ends of the interior frame assembly, covers 170 and 171 are provided as seen in FIG. 1 and in FIGS. 17 and 18, respectively, and described hereinbelow.

Figure 17:
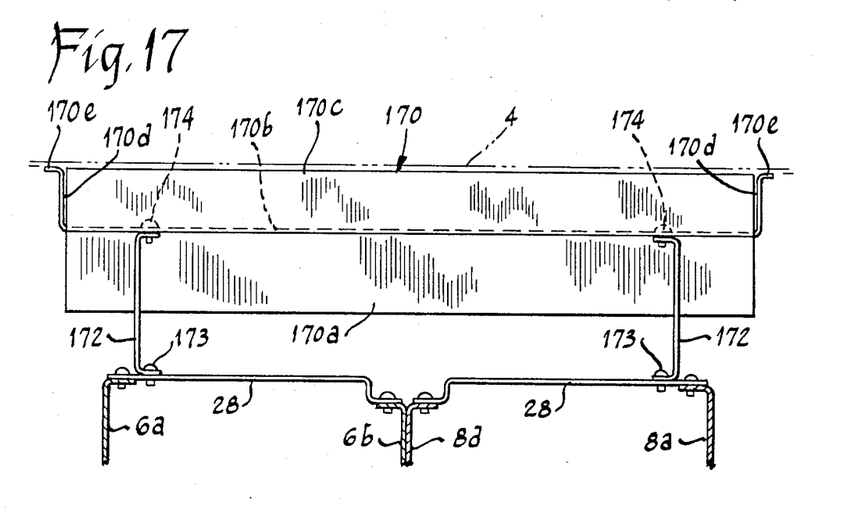
FIG. 17 is a view taken in the direction of the arrows of line 17—17 of FIG. 1 showing a lower end cover for the interior frame assembly.

In FIG. 17, a lower cover 170 is viewed from the bottom of the interior frame assembly. A pair of elongated C-shaped brackets 172 are attached to the brackets 28 by screws 173. Cover 170 has a Z-shaped cross-section comprising an upper rearwardly extending flange 170a, a vertical central leg 170b and a lower forwardly extending flange 170c. The ends of vertical leg 170b have forwardly extending arms 170d terminating in forward right angle flanges 170e which align with the forward flanges of the respective plug-on devices. Screws 174 secure the cover 170 to the forward ends of brackets 172.

Figure 18:
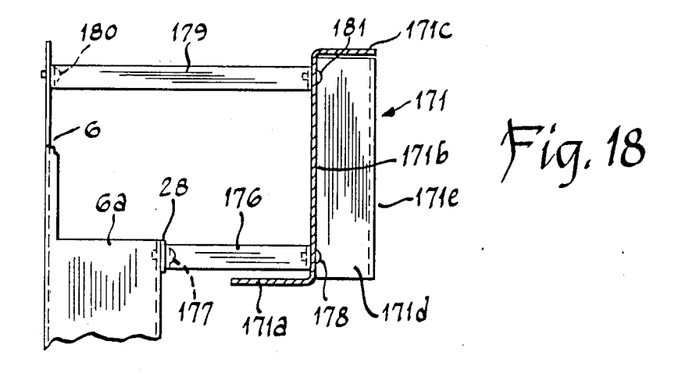
FIG. 18 is a cross-sectional view taken along line 18—18 of FIG. 1 showing a top cover for the interior frame assembly covering the neutral connector assembly.

Upper cover 171 is shown in transverse cross-section in FIG. 18. It comprises a Z-shaped cross-section having a lower rearwardly extending flange 171a, a vertical leg 171b and an upper forwardly extending flange 171c. The ends of vertical leg 171b have forwardly extending arms 171d terminating in a forward flange 171e, only one of which appears in FIG. 18. Cover 171 is attached to the interior frame assembly by a first pair of elongaged C-shaped brackets 176 attached to upper brackets 28 by screws 177 and to the vertical leg 171b by screw 178. A second pair of elongaged C-shaped brackets 179 are attached to the rear portions of panels 6 and 8 by screws 180 and to the vertical leg 171b of cover 171 by screws 181.

As may be seen in comparing FIGS. 9, 10 and 11 with each other and with FIGS. 8, 12 and 13, the circuit breaker units have varying depths from the front surface of the panelboard to the front surface of the respective units, while the enclosed switches and lug units have a uniform depth. The differences in heights are effectively closed-off to provide dead front protection by the side flanges of adjacent filler plates and enclosed switch units and the rearwardly projecting flanges 170a and 171a of lower and upper covers 170 and 171.

Figure 19:
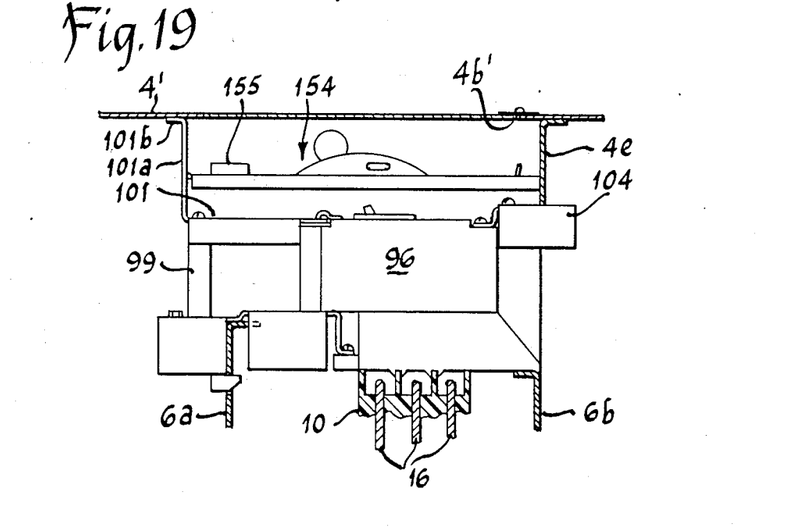
FIG. 19 is a cross-sectional view of a single interior frame panelboard showing a deadfront flange attached to the cover.

With reference to FIG. 19, when a single interior frame assembly is used and therefore only a single row of plug-on devices is provided, no forwardly projecting end structure is provided at what would be the inner end of such device on a twin interior frame assembly. In this instance, cover 4' in FIG. 19 is provided with a rearwardly extending flange 4e attached along the vertical edge of door opening 4b'. FIG. 19 shows a single interior frame assembly having a circuit breaker device such as circuit breaker 96 attached thereto in the foreground and an enclosed fusible switch device such as switch 154 shown in the background. Flange 4e extends along the right-hand end of switch 154 closely adjacent the ends of the cover and sides thereof, and similarly extends along the ends of any enclosed lug units that may be mounted on the panelboard. Flange 4e abuts the upper surfaces of filler plates such as 104 of circuit breaker device 96 and any other filler plate that may be used in such installation. In this manner, flange 4e cooperates with the forwardly extending end structures of the respective plug-on devices to provide a dead front for a single interior frame panelboard.

While the foregoing has described the power distribution panelboard of this invention in preferred embodiments, it is understood that it is susceptible to further arrangements and various modifications without departing from the scope of the appended claims.

We claim:

1. A power distribution panelboard comprising:
   a box-shaped enclosure having an open front;
   a panel mounted within said enclosure parallel to a rear wall thereof, said panel having forwardly extending mounting rails along opposed vertically disposed sides thereof;
   insulator means mounted to said panel between said mounting rails;
   a plurality of bus bars supported by said insulators and extending vertically in their lengthwise dimension parallel to said mounting rails;
   locating means on at least one of said mounting rails for defining vertical mounting increments along said rails;
   a plurality of devices from a group comprising enclosed lug connector devices, enclosed fusible switch devices and non-enclosed molded case circuit breaker devices mounted transversely across said mounting rails in variably selectable combinations and arrangements, each of said devices effecting a plug-on electrical connection with said bus bars with each said device seated firmly against said mounting rails and each having a respective height corresponding to a multiple of said increments;
   means on said devices cooperable with said locating means positioning a respective device on a multiple increment segment of said panel;
   one of said devices being a main device having incoming electrical power supply wires connected to wiring terminals of said device and supplying electrical power to said bus bars through said plug-on electrical connection of said device with said bus bars; and
   at least one of said devices being an enclosed fusible switch device and at least another one of said devices being a non-enclosed molded case circuit breaker device.

2. The panelboard defined in claim 1 wherein said locating means comprises a plurality of notches spaced along the length of said one of said rails, and said devices have upper and lower rearwardly extending side walls recieved in said notches for positioning said device along said rails.

3. The panelboard defined in claim 2 wherein said rearwardly extending side walls comprise slots open to rear edges of said side walls, said slots receiving said one of said rails therein, respective lateral edges of said slots being received within respective ones of said notches for aligning said device at respective vertical mounting increments along said rails.

4. The panelboard defined in claim 3 wherein said device comprises a spring biased latch member which is deflected by said one of said rails when mounting said device to said panel, said one of said rails comprises a plurality of openings in a forwardly extending portion thereof for receiving hook portions of said latch member with said device firmly seated upon said mounting rails and securing said device to said one of said rails, and cooperative engagement of said respective lateral edges of said slots with respective ones of said notches effecting alignment of said hook portions of said latch member with respective ones of said openings for latching engagement therebetween.

5. The panelboard defined in claim 1 further comprising a cover attached to said enclosure closing off the front of said enclosure, said cover having an opening providing access to fronts of said devices and a door hingedly attached to said cover for closing off said opening; said devices comprising end structures having heights equal to the height of the respective device and extending forwardly of front surfaces of the respective devices to said cover, said end structures being cooperatively aligned with said devices mounted to said panelboard to form vertically disposed lateral walls extending forwardly to said cover; and upper and lower end plates attached to said rails, each of said end plates having forwardly extending end structures and horizontally disposed wall portions extending forwardly to said cover, said end structures and said horizontally disposed wall portions cooperating with said cover to provide a dead front for said panelboard preventing access into said enclosure behind said devices through said opening in said cover.

6. The panelboard defined in claim 5 further comprising filler plates mounted to said mounting rails to extend transversely thereacross in spaces not occupied by said devices, said filler plates comprising end structures having heights equal to the height of the respective filler plate extending forwardly of a front surface of said respective filler plate to said cover, said filler plate end structures being cooperatively aligned with said device end structures and said end plate end structures and extending forwardly to said enclosure cover occupying spaces in said vertically disposed lateral walls not occupied by device end structures.

7. The panelboard defined in claim 5 wherein said end structures for circuit breaker devices comprise formed metal plates attached to the respective ends of molded case circuit breakers to extend laterally outward of said circuit breakers, said formed metal plates having forwardly directed end portions extending to said enclosure cover.

8. The panelboard defined in claim 7 wherein at least one of said formed metal plates is hingedly attached to said circuit breaker for permitting said plate to be pivoted forwardly for access to wiring terminals of said circuit breaker when said enclosure cover is removed.

9. The panelboard defined in claim 1 further comprising a cover attached to said enclosure closing off the front of said enclosure, said cover having an opening providing access to fronts of said devices, a door hingedly attached to said cover for closing off said opening, and a rearwardly extending flange proximate one lateral side of said opening;

said devices comprising end structures at a respective one end thereof, said end structures having heights equal to the height of the respective device and extending forwardly of front surfaces of the respective devices to said cover, said end structures being cooperatively aligned with said devices mounted to said panelboard to form a vertically disposed wall extending forwardly to said cover along an opposite lateral side of said cover opening; and upper and lower end plates attached to said rails, each of said end plates having forwardly extending end structures cooperatively aligned with said devices end structure and horizontally disposed wall portions extending forwardly to said cover, said end structures and said horizontally disposed wall portions cooperating with said cover to provide a dead front for said panelboard at upper and lower ends and along said opposite lateral side of said cover opening and said rearwardly extending flange extending along opposite ends of said lug devices and enclosed fusible switch devices and overlying portions of said circuit breaker devices to complete said dead front for said panelboard at said one side of said opening, thereby preventing access into said enclosure behind siad devices through said opening in said cover.

10. The panelboard defined in claim 1 wherein a plurality of said devices of a like kind are mounted on immediately adjacent segments and adjacent ones of said enclosed fusible switch devices and said non-enclosed molded case circuit breaker devices are mounted on segments separated by at least one mounting increment.

11. The panelboard defined in claim 1 wherein each said device comprises spring biased latch means engaging a respective one of said rails, said latch means comprising:

latch support means on at least one end of said device providing a handgrip for said device;

a latch having hook means engaging said rail and a release arm disposed in proximity to said handgrip pivotally mounted on each said support means intermediate said hook means and said release arm; and spring means biasing said hook means toward said rail and said release arm away from said handgrip.

12. The panelboard defined in claim 11 further comprising a screw threadably received in said support means and extending therethrough, said screw being rotatable to move an extending end thereof into abutting engagement with said release arm to block pivotal movement of said latch from a position thereof wherein said hook means engages said rail.

13. A power distribution panelboard comprising:
a box-shaped enclosure having an open front;
first and second panel assemblies each panel assembly comprising a pair of forwardly extending mounting rails disposed vertically parallel in their lengthwise dimension and spaced horizontally, insulator means disposed between said mounting rails, a plurality of bus bars supported by said insulator means and disposed parallel to said mounting rails, and locating means on said mounting rails defining vertical mounting increments along said rails, said first and second panel assemblies being joined along mutually adjacent ones of said mounting rails to form a twin panel assembly unit mounted to a rear wall of said enclosure;
a plurality of devices from a group comprising enclosed lug connector devices, enclosed fusible switch devices and non-enclosed molded case circuit breaker devices of varying heights and including devices having a transverse length sufficient for transverse mounting across said first or second panel assembly and twin size devices having a transverse length sufficient for transverse mounting across outermost mounting rails of said twin panel assembly mounted transversely across mounting rails of said first, second or twin panel assembly in a variably selectable arrangement, each of said devices effecting a plug-on electrical connection with said bus bars of a respective panel assembly with each said device seated firmly against said mounting rails; and one of said twin size devices mounted to said twin panel assembly being a main device having incoming electrical power supply wires connected to wiring terminals of said device and supplying electrical power to bus bars of said first and second panel assemblies in electrical parallel through plug-on connections of said main device with bus bars of each of said first and second panel assemblies.

14. The panelboard defined in claim 13 wherein said twin size devices have a plurality of parallel-connected plug-on electrical connector means for simultaneously engaging corresponding bus bars of both said first and second panel assemblies with said twin size device seated firmly against said outermost mounting rails for receiving electric power from said bus bars in electrical parallel.

15. The panelboard defined in claim 14 wherein said enclosed lug connector devices and said enclosed fusible switch devices are mounted substantially laterally across from another such device on respective ones of said first and second panel assemblies of said twin panel assembly in selectably variable arrangements irrespective of the heights of the respective devices.

16. The panelboard defined in claim 15 wherein a further twin size device having connector means for effecting plug-on electrical connection with corresponding bus bars of both panel assemblies is mounted to said panelboard for effecting plug-on phase collecting for said bus bars.

17. The panelboard defined in claim 13 wherein said twin size devices comprise spring biased latch means at each end thereof engaging said outermost mounting rails upon plug-on mounting of said twin size device to bus bars of said first and second panel assemblies, said latch means comprising:

latch support means on each end of said twin size device providing handgrips for said device;

a latch having hook means engaging a respective one of said rails and a release arm disposed in proximity to a respective handgrip pivotally mounted on each said support means intermediate said hook means and said release arm; and spring means biasing said hook means toward a respective rail and said release arm away from a respective handgrip.

18. The panelboard defined in claim 1 further comprising a neutral connector assembly mounted at a vertical end of said panel, said neutral connector assembly having a plurality of wiring connector lugs having wire receiving openings unidirectionally oriented toward a side wall of said enclosure.

19. The panelboard defined in claim 13 further comprising a neutral connector assembly mounted at a vertical end of said twin panel assembly, said neutral connector assembly having a first plurality of wiring connector lugs having wire receiving openings unidirectionally oriented horizontally toward a first side wall of said enclosure and a second plurality of wiring connector lugs having wire receiving openings unidirectionally oriented horizontally toward an opposite side wall of said enclosure.

* * * * *